M. AXILROD.
SUPPORTING AND ADJUSTING MEANS FOR CLUTCH AND BRAKE MECHANISM.
APPLICATION FILED OCT. 3, 1916.

1,260,296.

Patented Mar. 26, 1918.
2 SHEETS—SHEET 1.

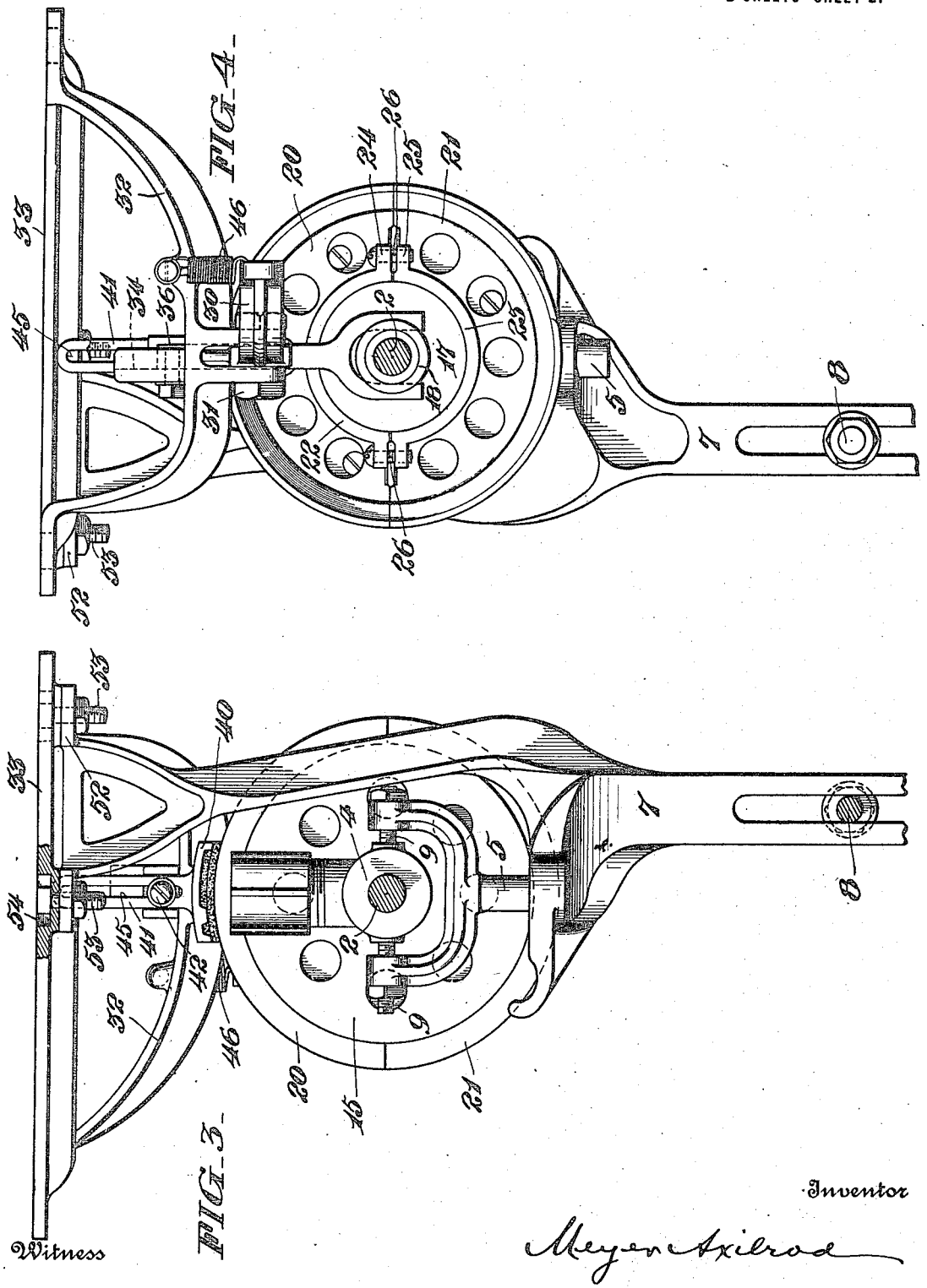

UNITED STATES PATENT OFFICE.

MEYER AXILROD, OF NEW YORK, N. Y.

SUPPORTING AND ADJUSTING MEANS FOR CLUTCH AND BRAKE MECHANISM.

1,260,296.  Specification of Letters Patent.  Patented Mar. 26, 1918.

Application filed October 3, 1916. Serial No. 123,475.

*To all whom it may concern:*

Be it known that I, MEYER AXILROD, a citizen of the United States, and a resident of the city of New York, county of New York, State of New York, have invented certain new and useful Improvements in Supporting and Adjusting Means for Clutch and Brake Mechanism, of which the following is a specification.

My invention has for one of its objects to provide means whereby when an adjustable shaft is adjusted laterally or horizontally the means for shifting a clutch member or a driving member on said shaft may also be adjusted and shifted in a corresponding direction; and also whereby when such shaft is adjusted and shifted vertically a portion of the said means may be correspondingly adjusted and shifted.

A further object is to provide means whereby driving or power transmitting pulleys may be interchanged; that is to say, a larger one interchanged with a smaller one or vice versa, and whereby when such interchange is made the brake for said pulley may be adjusted in relation thereto.

Other objects and advantages of my invention will be specifically referred to hereinafter in the detailed description of my invention or will be apparent from such description.

In order that my invention may be more readily understood and its practical advantages more fully appreciated and comprehended reference should be had to the accompanying drawings in which I have illustrated one form of embodiment of my invention.

In the drawings,—

Fig. 3 is a view in elevation looking toward the left in Fig. 1, the shaft being shown in transverse section; and Fig. 4 is a similar view looking toward the right in Fig. 1, the shaft being shown in section.

Figure 1:
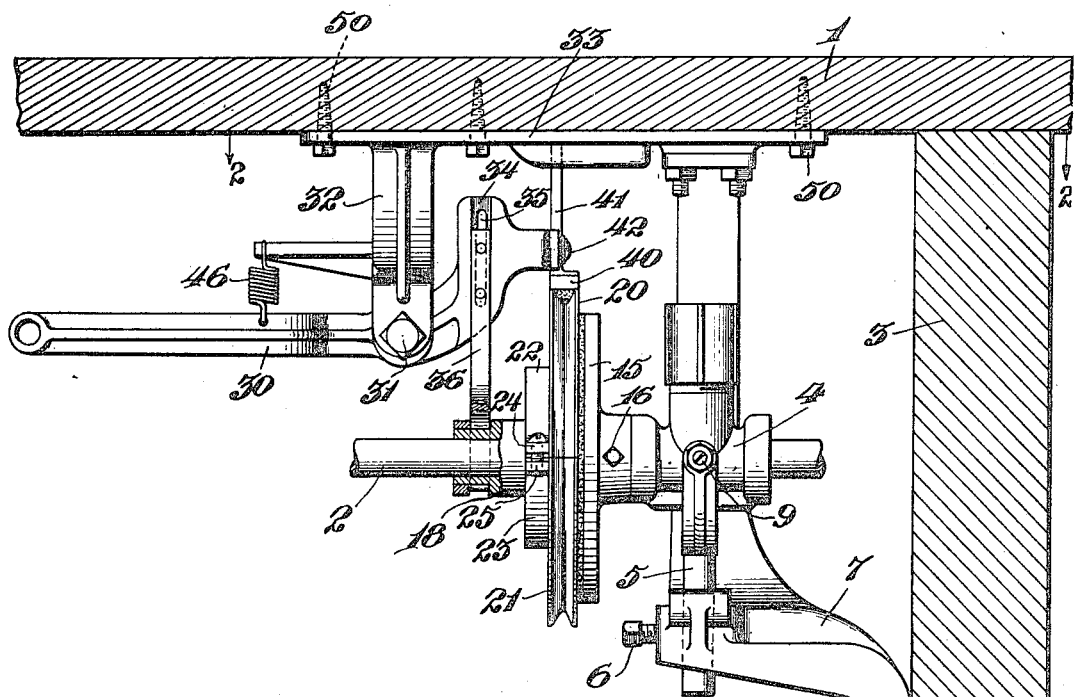
Figure 1 is a view showing in side elevation a construction embodying my invention, a portion of the shaft supporting means being shown in vertical section and a portion of a table and one of the table supports being also shown in section.
Figure 2:
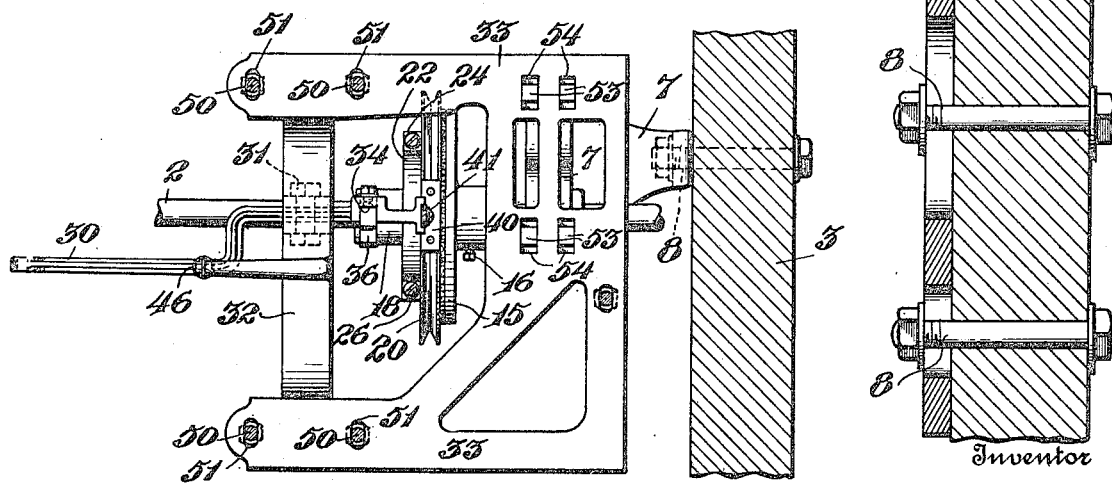
Fig. 2 is a horizontal sectional view taken on the line 2—2 of Fig. 1.

Referring to the drawings, 1 designates a table upon which machines, such as sewing machines shown in Patent No. 1,188,385, issued to me June 27th, 1916, or any other type of machine adapted to be supported upon a similar table, are supported. Usually these machines are provided at intervals upon a long table and all are operated from a single shaft such as 2. The table is supported upon legs or other suitable supports at intervals such as is indicated at 3. The shaft 2 is supported in a bearing 4 and is adapted to be adjusted both vertically and laterally. Vertical adjustment may be effected by adjusting the shank 5 which is secured by means of a binding screw 6 upon a support 7 secured by means of bolts 8 to a leg 3. Lateral adjustment of the bearing 4 and consequently of the shaft 2 is effected by an adjustment of the adjustable screw bolts 9. The adjustment of the shaft is effected in the manner fully described in the patent aforesaid issued to me.

15 designates a friction clutch member rigidly secured by means of a binding screw 16 to the shaft 2. 17 designates a collar having an integral sleeve-like projection 18 extending therefrom in a direction away from the clutch member 15, the said collar and sleeve being slidable upon the shaft 2.

The driving pulley, as constructed by me, is sectional and consists of two semi-circular members 20 and 21. When the two members are secured together, as shown in Fig. 4, they constitute an annulus or ring-like member. At their inner edges these members are each provided with semi-circular flange-like portions 22 and 23, each of which is provided with outwardly extending projections 24 and 25, which, when the two members 20 and 21 are assembled, are in adjacent opposing relation to each other and are secured together by means of binding screw bolts 26. By means of these bolts the two sections 20 and 21 may be secured in place about the collar 17 in the manner shown in Fig. 4 of the drawings. It is apparent that by removing the screw bolts 26, the sections 20 and 21 may be removed and other smaller or larger sections substituted therefor and secured in position upon the collar 17 in the same manner as shown in Fig. 4. In that way smaller or larger driving pulleys may be substituted for the pulley which is shown.

The means for shifting the driving pulley upon the shaft 2 into and out of engagement with the friction face of the clutch 15 comprises a lever 30 pivotally supported at 31 upon a curved bracket 32 extending downwardly from a supporting plate 33. The lever 30 projects to the right beyond the pivot 31. (See Fig. 1.) The said extended portion is provided at a point near the pivot 31 with a groove 34 and an elongated slot 35 centrally located with respect to said groove.

36 designates a fork, the lower forked end of which is adapted to engage the sleeve-like portion 18 so that when the fork is shifted as a result of moving the lever 30 about its pivot the collar 17 and the pulley secured thereon are correspondingly shifted. The upper shank end portion of the said fork is situated within the groove 34 and may be secured in adjusted position therein by means of clamping pins or screws which extend through the slot 35 and engage the said shank portion of the fork. If the shaft 2 should be adjusted vertically, either up or down, it might be necessary to effect a corresponding adjustment of the fork 36. This could be done by loosening the holding or securing screws or pins and sliding the said fork the necessary distance in a corresponding direction in the groove 34 and then retightening the holding or securing screws or pins.

The engaging portion 40 of the brake, which engages the groove of the driving pulley already described, is supported upon the lower end of a shank 41 which is adjustably secured at 42 in the outer end of the extended portion of the lever 30. The shank 41 is provided with a longitudinally extending slot 45 through which the fastening means at 42 extends. It is clear that by loosening the said fastening means the shank 41 may be adjusted up or down so as to accommodate driving pulleys of different sizes, that is, of different diameters, and also to accommodate the vertical adjustment up or down of the shaft 2.

Normally the lever 30 is held in such position by the spring 46 that the driving pulley is disengaged from the clutch 15 and the brake 40 applied to the said pulley to prevent rotation thereof. The outer end of the said lever, that is to say, the end extending toward the left from its pivot, having reference to Fig. 1, may be depressed by means of a tread lever and connecting rod or wire such as is employed in the invention aforesaid issued to me.

The curved bracket 32 is secured at its opposite ends to the plate 33, as is clearly shown in Figs. 3 and 4 of the drawings. The said plate 33 is secured to the table 1 by means of screws 50 which pass through slots 51 in said plate. The plate 33 is also secured to the upper end portion 52 of the support 7 by means of bolts 53 which extend through slots 54 through the said plate. It is apparent that by loosening the screws 50 and the bolts 53 the plate 33 may be adjusted laterally, that is to say, in directions transversely of the table 1 and of the shaft 2. It is in this way that provision is made for adjusting the means for shifting the driving pulley into and out of engagement with the clutch laterally in either of two directions to correspond with the lateral adjustment of the shaft 2 when such adjustment is effected by the adjusting means 9.

It will be observed that the support 7 is adjustably connected with the leg 3. This is necessary in order that the upper end of the support 7 may be drawn by the bolts and nuts 53 tightly up against the supporting plate 33.

I claim:—

1. In combination, a shaft adjustable both vertically and horizontally, clutch and driving members mounted on said shaft, actuating means for actuating one of the said members and means for adjusting said actuating means in directions corresponding with the adjustments of the said shaft.

2. In combination, a shaft adjustable both horizontally and vertically, driving and clutch members mounted on said shaft, actuating mechanism for actuating one of said members, means for adjusting the said actuating mechanism as a whole horizontally and means for adjusting a portion thereof vertically.

3. In combination, a shaft adjustable laterally in two directions at right angles to each other, driving and clutch members mounted on said shaft, mechanism for causing engagement and disengagement of the said members with and from each other, means for supporting the said mechanism and means whereby said mechanism may be adjusted to correspond with the adjustments of the said shaft.

4. In combination, an adjustable shaft, driving and clutch members mounted on said shaft, means for actuating one of said members to cause engagement and disengagement thereof, a plate having adjustable connection with its support, said plate having a depending bracket, means for pivotally connecting the said actuating means to said bracket, means for adjustably connecting one portion of the said actuating means to the other portion thereof and a vertically adjustable brake secured to the said actuating means and being adapted to engage and disengage the said driving member.

5. In combination, an adjustable shaft, driving and clutch members mounted on said shaft, the said driving member consisting of separable sections whereby the same may be readily removed and replaced by a driving member of a different size, a plate having adjustable connection with its support, a bracket depending from said plate, a lever pivoted intermediate its ends to the said bracket, an arm adjustably connected with the said lever adjacent to its pivot, said arm being adapted to engage one of the said members to effect movement thereof to cause engagement and disengagement of the said members with and from each other and a vertically adjustable brake also supported upon the said lever and adapted to be moved from and into engagement with the said driving member by the actuation of the said lever.

In testimony that I claim the foregoing as my invention, I have hereunto signed my name this 30th day of September, A. D. 1916.

MEYER AXILROD.